US008308059B2

(12) United States Patent
Granucci et al.

(10) Patent No.: US 8,308,059 B2
(45) Date of Patent: Nov. 13, 2012

(54) REAL-TIME CARD CREDIT LIMIT ON CARD PLASTIC

(75) Inventors: Nicole Janine Granucci, San Francisco, CA (US); Carrie Elaine Vriheas, San Francisco, CA (US); Ayman Hammad, Pleasanton, CA (US); James Y. C. Sze, San Diego, CA (US)

(73) Assignee: Visa U.S.A., Inc., San Francisco, CA (US)

( * ) Notice: Subject to any disclaimer, the term of this patent is extended or adjusted under 35 U.S.C. 154(b) by 358 days.

(21) Appl. No.: 12/319,598

(22) Filed: Jan. 9, 2009

(65) Prior Publication Data

US 2009/0314840 A1  Dec. 24, 2009

Related U.S. Application Data

(60) Provisional application No. 61/132,528, filed on Jun. 19, 2008.

(51) Int. Cl.
*G06K 5/00* (2006.01)
*G06K 19/06* (2006.01)
*G06Q 40/00* (2012.01)
*G07D 11/00* (2006.01)
*G07F 19/00* (2006.01)

(52) U.S. Cl. ......... 235/380; 235/492; 235/379; 235/493

(58) Field of Classification Search .................. 235/380, 235/375, 492, 493, 379, 449
See application file for complete search history.

(56) References Cited

U.S. PATENT DOCUMENTS

| 3,356,021 | A |   | 12/1967 | May et al. |
| 4,044,231 | A |   | 8/1977  | Beck et al. |
| 4,614,861 | A |   | 9/1986  | Pavlov et al. |
| 4,639,584 | A | * | 1/1987  | Adams et al. ................. 235/449 |
| 4,701,601 | A |   | 10/1987 | Francini et al. |
| 4,814,591 | A |   | 3/1989  | Nara et al. |
| 4,868,376 | A |   | 9/1989  | Lessin et al. |
| 4,877,179 | A |   | 10/1989 | Baker et al. |
| 5,034,597 | A |   | 7/1991  | Atsumi et al. |
| 5,055,662 | A |   | 10/1991 | Hasegawa |
| 5,359,183 | A |   | 10/1994 | Skodlar |
| 5,521,363 | A | * | 5/1996  | Tannenbaum ................. 235/379 |
| 5,590,038 | A | * | 12/1996 | Pitroda ......................... 235/380 |
| 5,591,949 | A |   | 1/1997  | Bernstein |

(Continued)

FOREIGN PATENT DOCUMENTS

EP           291259 A          11/1988

(Continued)

OTHER PUBLICATIONS

"SmarTrip More Than a Smart Card, It's Pure Genius"; 1998-2004, WMATA, http://www.wmata.com/riding/smartrip.cfm.

(Continued)

*Primary Examiner* — Thien T Mai
(74) *Attorney, Agent, or Firm* — Kilpatrick Townsend & Stockton (57) ABSTRACT

A system, method and credit card configured to display a current card balance on the credit card. The credit card receives a balance request from a button on the card. After retrieving the current card balance encoded on the credit card, the card displays the current card balance. Remote terminals may be configured to support the real-time display of a balance on a credit card by writing the current balance to the card after a payment transaction has occurred.

21 Claims, 8 Drawing Sheets

U.S. PATENT DOCUMENTS

| | | | |
|---|---|---|---|
| 5,678,939 A | 10/1997 | Ross | |
| 5,777,903 A | 7/1998 | Piosenka et al. | |
| 6,378,775 B2 | 4/2002 | Hayashida | |
| 6,556,126 B1 | 4/2003 | Imazuka et al. | |
| 6,631,849 B2 * | 10/2003 | Blossom | 235/492 |
| 6,749,118 B2 | 6/2004 | Kobayashi et al. | |
| 6,926,200 B1 | 8/2005 | Hayashida | |
| 6,990,330 B2 | 1/2006 | Veerepalli et al. | |
| 7,159,770 B2 | 1/2007 | Onozu | |
| 7,213,755 B2 | 5/2007 | Newsome et al. | |
| 7,440,771 B2 | 10/2008 | Purk | |
| 7,653,599 B2 | 1/2010 | Doran et al. | |
| 7,793,581 B2 | 9/2010 | Erskine | |
| 7,828,220 B2 | 11/2010 | Mullen | |
| 7,931,195 B2 | 4/2011 | Mullen | |
| 7,954,705 B2 | 6/2011 | Mullen | |
| 8,011,577 B2 | 9/2011 | Mullen | |
| 8,020,775 B2 | 9/2011 | Mullen | |
| 8,074,877 B2 | 12/2011 | Mullen | |
| 2001/0003445 A1 | 6/2001 | Gauther et al. | |
| 2001/0013542 A1 | 8/2001 | Horowitz et al. | |
| 2004/0064406 A1 | 4/2004 | Yates et al. | |
| 2005/0065884 A1 | 3/2005 | Capurso | |
| 2008/0029607 A1 | 2/2008 | Mullen | |
| 2008/0035738 A1 | 2/2008 | Mullen | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065555 A1 | 3/2008 | Mullen | |
| 2008/0099556 A1 * | 5/2008 | Park | 235/382.5 |
| 2008/0302869 A1 | 12/2008 | Mullen | |
| 2008/0302876 A1 | 12/2008 | Mullen | |
| 2009/0078777 A1 | 3/2009 | Granucci et al. | |
| 2009/0081990 A1 | 3/2009 | Granucci et al. | |
| 2009/0134218 A1 * | 5/2009 | Yuzon et al. | 235/382 |
| 2009/0159663 A1 | 6/2009 | Mullen | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen et al. | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159700 A1 | 6/2009 | Mullen et al. | |
| 2009/0159701 A1 | 6/2009 | Mullen et al. | |
| 2009/0159702 A1 | 6/2009 | Mullen et al. | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159706 A1 | 6/2009 | Mullen et al. | |
| 2009/0159707 A1 | 6/2009 | Mullen et al. | |
| 2009/0159708 A1 | 6/2009 | Mullen et al. | |
| 2009/0159709 A1 | 6/2009 | Mullen et al. | |
| 2009/0159710 A1 | 6/2009 | Mullen et al. | |
| 2009/0159711 A1 | 6/2009 | Mullen et al. | |
| 2009/0159712 A1 | 6/2009 | Mullen et al. | |
| 2009/0159713 A1 | 6/2009 | Mullen et al. | |
| 2009/0160617 A1 | 6/2009 | Mullen et al. | |
| 2009/0308921 A1 | 12/2009 | Mullen | |
| 2009/0314840 A1 | 12/2009 | Granucci et al. | |
| 2011/0272465 A1 | 11/2011 | Mullen et al. | |
| 2011/0272466 A1 | 11/2011 | Mullen et al. | |
| 2011/0272467 A1 | 11/2011 | Mullen et al. | |
| 2011/0272471 A1 | 11/2011 | Mullen et al. | |
| 2011/0272472 A1 | 11/2011 | Mullen et al. | |
| 2011/0272473 A1 | 11/2011 | Mullen et al. | |
| 2011/0272474 A1 | 11/2011 | Mullen et al. | |
| 2011/0272475 A1 | 11/2011 | Mullen et al. | |
| 2011/0272476 A1 | 11/2011 | Mullen et al. | |
| 2011/0272477 A1 | 11/2011 | Mullen et al. | |
| 2011/0272478 A1 | 11/2011 | Mullen et al. | |
| 2011/0272479 A1 | 11/2011 | Mullen et al. | |
| 2011/0272480 A1 | 11/2011 | Mullen et al. | |
| 2011/0272481 A1 | 11/2011 | Mullen et al. | |
| 2011/0272482 A1 | 11/2011 | Mullen et al. | |
| 2011/0272483 A1 | 11/2011 | Mullen et al. | |
| 2011/0272484 A1 | 11/2011 | Mullen et al. | |
| 2011/0276380 A1 | 11/2011 | Mullen et al. | |
| 2011/0276381 A1 | 11/2011 | Mullen et al. | |
| 2011/0276416 A1 | 11/2011 | Mullen et al. | |
| 2011/0276424 A1 | 11/2011 | Mullen et al. | |
| 2011/0276425 A1 | 11/2011 | Mullen et al. | |
| 2011/0276436 A1 | 11/2011 | Mullen et al. | |
| 2011/0276437 A1 | 11/2011 | Mullen et al. | |
| 2011/0278364 A1 | 11/2011 | Mullen et al. | |
| 2011/0282753 A1 | 11/2011 | Mullen et al. | |

FOREIGN PATENT DOCUMENTS

| | | |
|---|---|---|
| EP | 884293 A | 5/1998 |
| EP | 1017756 A1 | 7/2000 |
| TR | 2008 03302 Y | 9/2008 |

OTHER PUBLICATIONS

"Adding value to SmarTrip is as easy as using it"; 1998-2004, WMATA, http://www.wmata.com/riding/smartrip_adding_value.cfm.

Lucy Lzarony; "Stuck for a gift? Give a prepaid credit card", 1998, www.bankrate.com.

Office Action dated Dec. 8, 2011 from U.S. Appl. No. 11/904,335, 23 pages.

* cited by examiner

REAL-TIME CARD CREDIT LIMIT ON CARD PLASTIC

RELATED APPLICATIONS

This application claims priority to U.S. Provisional Patent Application No. 61/132,528, entitled Real-Time Card Limit on Card Plastic, filed Jun. 19, 2008.

BACKGROUND

1. Field of the Invention

Aspects of the present invention relate in general to financial services. Aspects include a credit card apparatus, system, method and computer-readable medium to display a real-time credit card balance, remaining credit limit, cash advance balance, or remaining cash advance limit. Further aspects of the invention include a method of storing and displaying a real-time remaining credit limit, cash advance balance, or remaining cash advance limit on a credit card.

2. Description of the Related Art

Credit cards and charge cards are a ubiquitous part of modern finance.

When a consumer cardholder makes a purchase, credit cards may be used to pay for the transaction. With credit cards, cardholders may pay for transactions up to a certain pre-set limit. The credit limit of a card is the maximum dollar amount a cardholder (sometimes referred to as a borrower) may charge on his/her revolving credit account. The credit limit is also known as a "credit line," or "line size." Some credit card issuers (also known as lenders or "issuers") set separate limits for purchases and cash advances.

When the total purchase amounts exceed the credit limit of the card, the cardholder is often assessed an "over the limit" fee by the credit card issuing institution (the "issuer"). Spending more than the credit limit will make the account over-limit, which may cause the lender to charge an over-limit fee and/or cancel account privileges.

Cardholders who carry credit cards are often unaware of the balance of a credit card (also referred to as "available credit"), especially when many purchase transactions have taken place. While the cardholder can look up their balances on-line, or via the telephone, many cardholders simply stop using their credit cards, even though they have not charged up their entire credit limit.

Many credit cards allow a cardholder to obtaining cash from a revolving account, usually at an automatic teller machine (ATM). Such cash advances are recorded on billing statements separately from purchases of goods or services. There is usually a limit on the total cash advance per month (known as the "cash advance limit"), a special fee associated with the transaction, and a higher annual percentage rate (APR) on the cash amount borrowed.

Similarly, cardholders often do not know their the remaining balance of their cash advance limit ("available cash limit"), and are consequently discouraged from taking advantage of the cash advance feature of a credit card.

SUMMARY

Currently, neither a current credit card balance nor a remaining credit limit is stored on a credit card. Embodiments of the invention include a system, method and credit card configured to display either their current credit card balance or remaining credit limit on the credit card. The credit card receives a balance request from a button on the card. After retrieving the current card balance encoded on the credit card, the card displays the current card balance.

DETAILED DESCRIPTION

One aspect of the present invention includes the realization that displaying a real-time balance or remaining credit limit on a credit card increases the likelihood of credit card usage by cardholders. With the card balance or credit limit display solution, card holders would be able to check their balance at any time, generating a higher volume of unplanned purchases, and potentially a higher amount uses at the point of sale.

Embodiments of the present invention include a card apparatus, system, method, and computer-readable medium configured to support the real-time display of a current balance or remaining credit limit on a credit card. Other embodiments of the present invention may include remote terminals configured to support the real-time display of a balance or remaining credit limit on a credit card.

In general, a credit card allows a cardholder to make purchases in which they are later billed. Credit card accounts allow cardholders to carry a balance from one billing cycle to the next; however, credit cardholders pay interest on that balance.

A charge card is a specific kind of credit card. The balance on a charge card account is payable in full when the statement is received, and cannot be rolled over from one billing cycle to the next.

For the purposes of this patent, all references to credit cards encompass and include charge cards.

A real-time or current balance is the total amount of money owed (by the cardholder) on a credit card. The current balance may include unpaid balances from previous months, purchases, cash advances, fees, interest, transaction charges, and credits. The current balance is may also be referred to as the "outstanding balance."

It is understood by those known in the art that the current balance and the remaining credit limit are related by the following formula:

current balance+remaining credit limit=credit limit

Similarly, it is understood by those known in the art that:

cash advance limit=current cash advance balance+
remaining cash advance limit

Figure 1A:
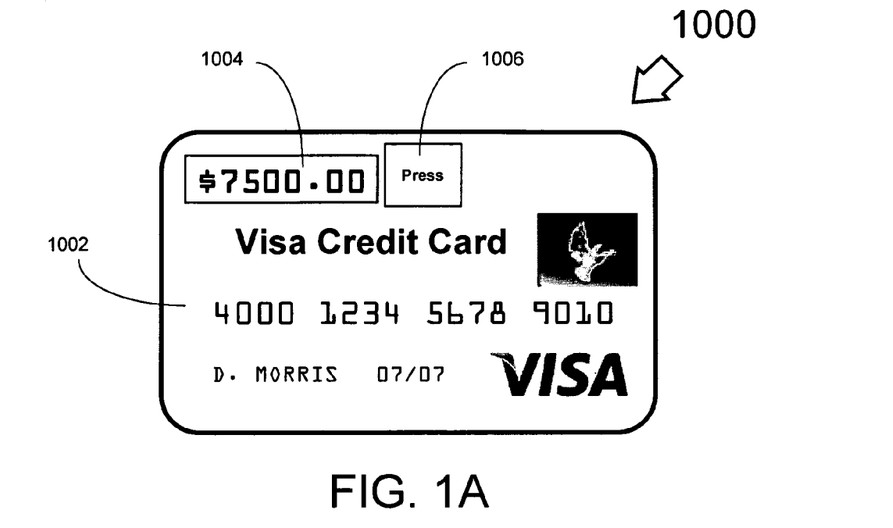
FIGS. 1A-B illustrate an embodiment of a credit card configured to display the current balance or remaining credit limit of the card.
Figure 1B:
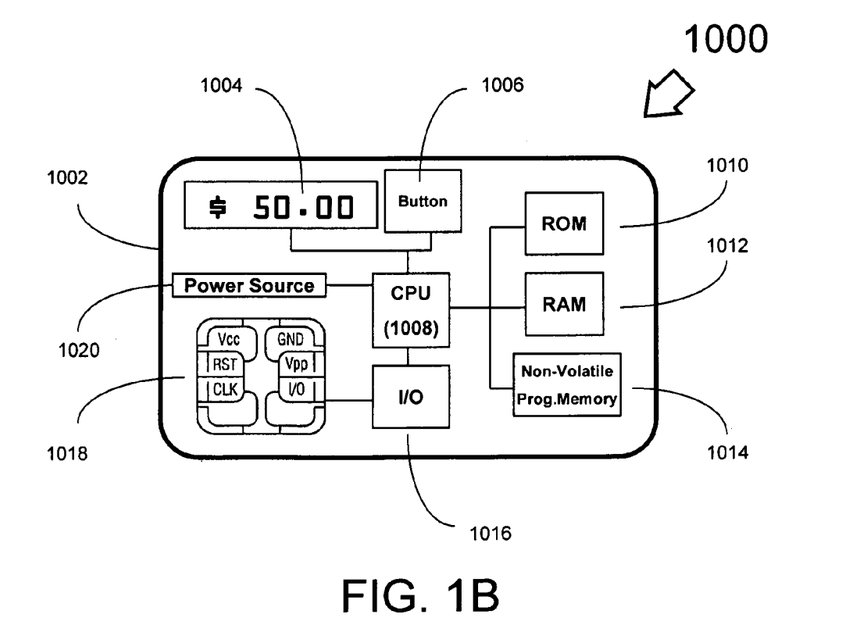

Turning to FIGS. 1A-B, these figures depict a credit card 1000 configured to display a real-time balance or remaining credit limit, constructed and operative in accordance with an embodiment of the present invention.

As shown in FIG. 1A, the credit card 1000 includes a plastic support 1002, a display 1004, and a button 1006. It is understood that plastic support 1002 may further contain a stamped imprint of a primary account number a customer name, expiration date, and various security measures such as a hologram or signature panel. Some embodiments of plastic support 1002 also have a magnetic stripe containing the personal account number (PAN) and the card expiration date.

Display 1004 may be a liquid crystal display (LCD), light-emitting-diode (LED), organic light-emitting-diode (OLED), surface-conduction electron-emitter display (SED), digital light processing (DLP), interferometric modulator display (IMOD) or any other display known in the art that can be used within the form factor required by the credit card 1000.

Button 1006 may be any sensor button known in the art. It is understood by those familiar in the art that one or more buttons may be implemented.

Internal components of credit card 1000 are shown in FIG. 1B. Embedded within plastic support 1002, a processor or central processing unit 1008 is electrically coupled to the display 1004, button 1006, Read-Only-Memory (ROM) 1010, Random Access Memory (RAM) 1012, a non-volatile programmable memory 1014, input/output circuitry 1016, and power supply 1020. It is understood by those familiar with the art that some or all of these elements may be embedded together in some combination as an integrated circuit (IC). Embodiments may also contain a conductive contact-making element 1018.

Processor 1008 may be any central processing unit, microprocessor, micro-controller, computational device or circuit known in the art.

Read only memory 1010 is embedded with an operating system.

Non-volatile programmable memory 1014 is configured to be an application memory device, and may store information such as the primary account number and/or current balance information. Examples of non-volatile programmable memory 1014 include, but not limited to: a magnetic stripe, flash memory, Electrically Erasable Programmable Read-Only Memory (EEPROM), or any other non-volatile computer memory or storage known in the art.

Random access memory 1012 is any temporary memory storage medium element known in the art. Random access memory is usually (but does not have to be) volatile memory.

The processor 1008, the read only memory 1010, the random access memory 1012 and the non-volatile programmable memory 1014 may coupled to one another through an internal bus system. Data can be interchanged between the input/output unit 1016, the processor 1008 and the non-volatile programmable memory 1014. Furthermore, data can be interchanged between the processor 1008 and the non-volatile programmable memory 1014.

Additionally, in some embodiments, the input/output circuitry 1016 is further coupled to a conductive contact-making element 1018 being formed in a surface area of the plastic support 1002. In some embodiments, the conductive contact-making element 1018 may be replaced by a radio frequency (RF) transceiver 1018. Radio frequency embodiments may typically use any RF transceiver known in the art for use in a radio frequency identifier (RFID) application or commonly used in a "pay wave" or "contactless" credit card.

In yet other embodiments, a contactless RF transceiver may be embedded in plastic support 1002 in addition to the conductive contact-making element 1018.

The electrically conductive contact-making element 1018 contains area elements that are electrically decoupled from one another, and these are annotated VCC, GND, RST, VPP, CLK and I/O. VCC is the connection for a supply voltage, RST is the connection for a reset signal, CLK is the connection for a clock signal, GND is the ground connection, VPP is the connection for a programming voltage, and I/O forms a connection as a data input/data output. The connection RST is used for application of a start signal for communication. A clock for the smart card processor is supplied from the outside via the connection CLK, with the clock frequency according to the described exemplary embodiment being 7.5 MHz. The programming voltage which is applied to the connection VPP is usually a voltage higher than the supply voltage. Bi-directional data transmission takes place via the input/output connection I/O for the actual interchange of useful information with the smart card. Similar data exchange or transmission takes place in contactless embodiments.

Power supply 1020 may be any electrical power supply, including a battery, fuel cell, long-term capacitor or any other power storage known in the art. Power supply 1020 may be recharged by applying a direct current voltage. A voltage is applied to the credit card 1000 as the supply voltage VCC. Example supply voltages include 5 volts, 3.3 volts, or 1.7 volts.

Figure 2A:
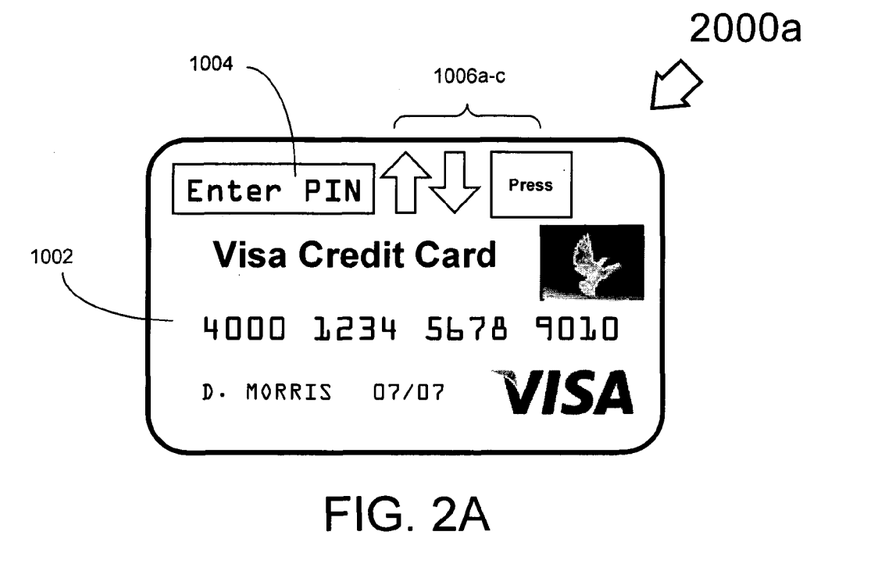
FIGS. 2A-B depict an alternate embodiment of a credit card configured to display the current balance or remaining credit limit of the card.
Figure 2B:
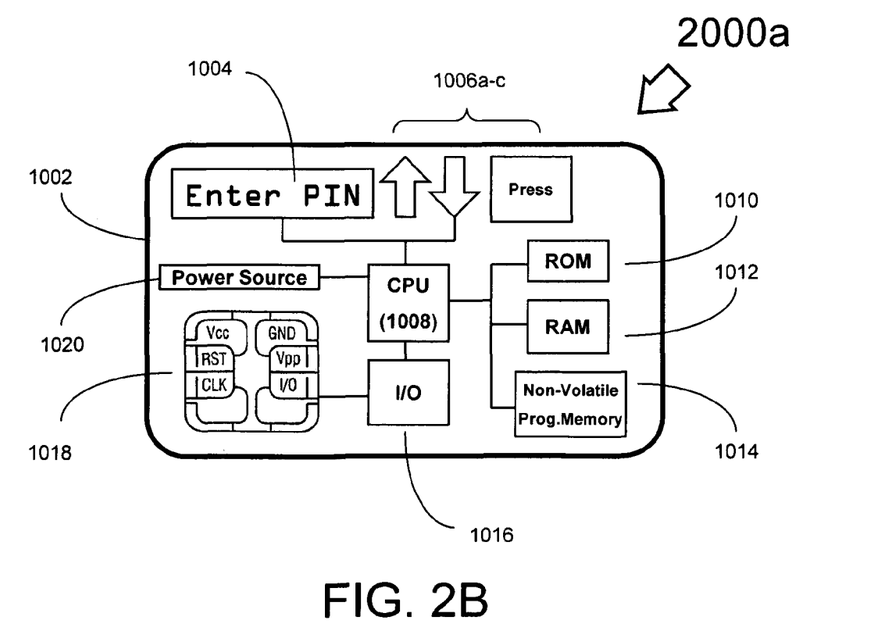

As shown in FIGS. 2A-B, constructed and operative in accordance with an embodiment of the present invention, an embodiment of a credit card 1000 is similar to the embodiment of FIGS. 1A-B, and may have multiple buttons 1006a-c. It is understood by those known in the art that any number of buttons 1006 may be implemented on a credit card, and that the choice of three buttons 1006 is for illustrative purposes only. Arrow buttons 1006a-b may be used for entering alpha-numeric information such as a personal identification number (PIN) or alpha-numeric code. Some embodiments may implement buttons 1006 as part of a numeric pad or alpha-numeric keyboard, but available space on the card is a limitation.

Figure 3:
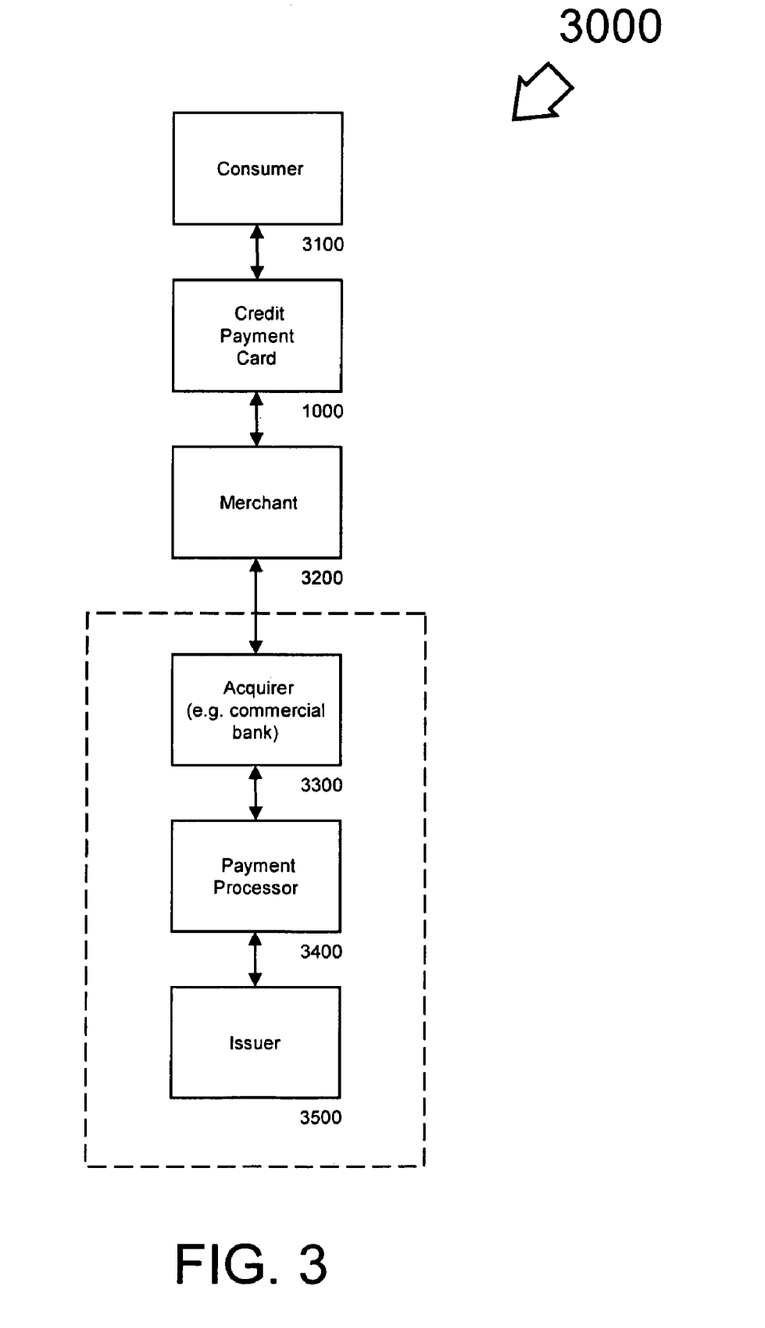
FIG. 3 is a block diagram of a system embodiment to support the display of a current balance or remaining credit limit on a credit card.

FIG. 3 illustrates a system to support the display of a real-time credit card balance, available credit, cash limit, or available cash balance, constructed and operative in accordance with an embodiment of the present invention. A customer 3100 receives a credit card 1000 from an issuer 3500.

When the consumer 3100 uses the credit card 1000 at a merchant 3200 to pay for a product or service, the merchant 3200 contacts an acquirer 3000 (for example, a commercial bank) to determine whether the primary account number has sufficient available credit to pay for the transaction. The acquirer 3300 forwards the details of the payment transaction to a payment processor 3400 for processing. Payment processor may be any payment network known in the art. In some instances, the payment processor 3400 determines whether the transaction should be allowed; in other instances, the payment processor 3400 queries the issuer 3500 to determine whether the credit card has enough available credit to allow the transaction.

Similarly, when the consumer 3100 uses the credit card 1000 at an automatic teller machine (located at the merchant bank or acquirer 3300) to obtain a cash advance, the acquirer 3300 forwards the details of the cash advance to a payment processor 3400 for processing. In some instances, the payment processor 3400 determines whether the transaction should be allowed; in other instances, the payment processor 3400 queries the issuer 3500 to determine whether the credit card has enough available cash balance to allow the transaction.

Figure 4:
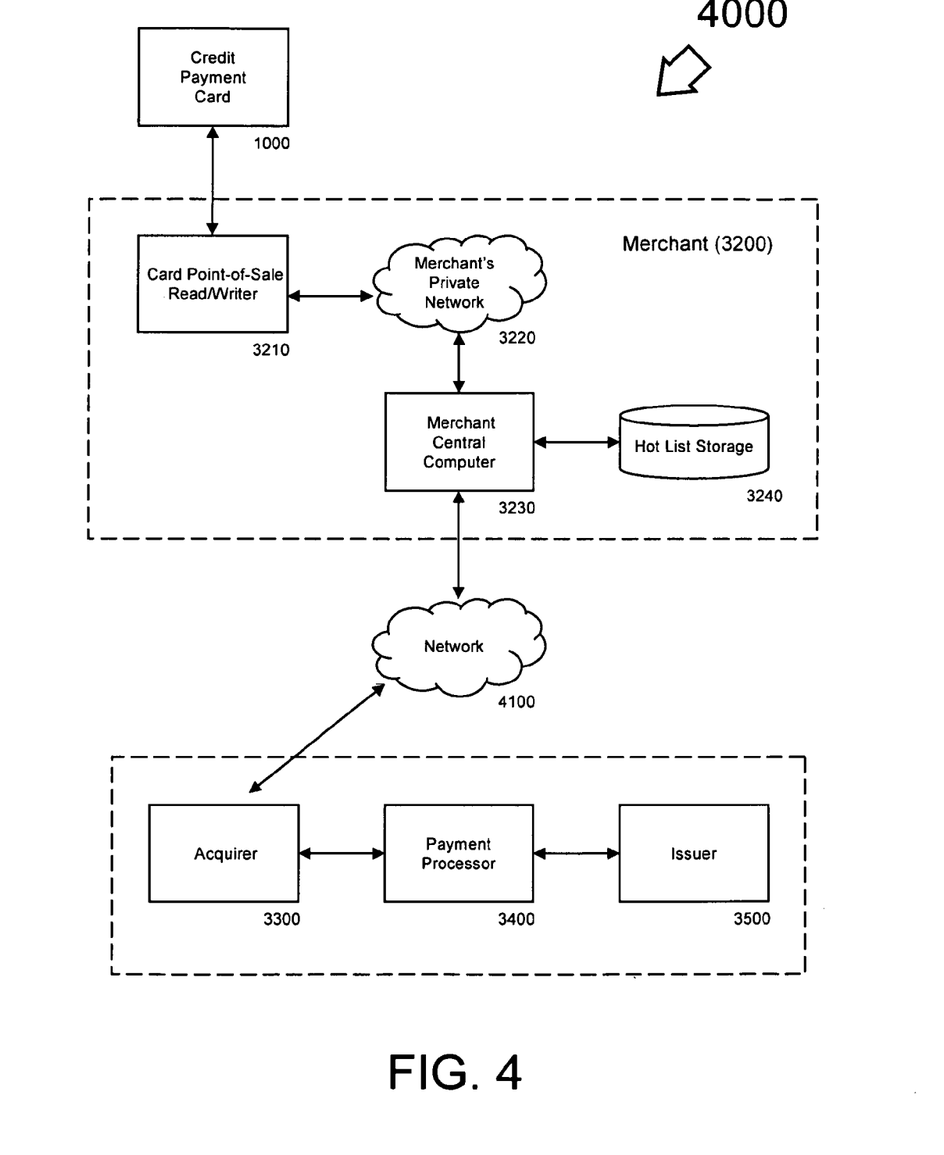
FIG. 4 is an expanded view of a merchant's system embodiment to support the display of the current balance or remaining credit limit on a credit card.

FIG. 4 depicts merchant 3200 in greater detail, where merchant 3200 includes a system to support the display of a real-time credit card balance, available credit, cash limit, or available cash balance constructed and operative in accordance with an embodiment of the present invention. As shown, in FIG. 4, merchant 3200 comprises a card point-of-sale read/writer 3210 that communicated with a merchant central computer 3230 via the merchant's private network 3220. In some embodiments, merchant central computer 3230 may be coupled to hot list storage 3240.

Card point-of-sale read/writer 3210 is any device capable of reading a personal account number off a credit card 1000, and write card balance information to the credit card 1000.

Merchant central computer 3230 is a networked device capable of communicating transaction data with card point-of-sale read/writer 3210 and transmitting the transaction data over network 4100 to acquirer 3300.

Hot list storage 3240 may be any list, database, or memory structure containing either invalid or valid primary account numbers.

Operation of these credit card and system embodiments of the present invention may be illustrated by example.

We now turn our attention to method or process embodiments. It is understood, by those known in the art that instructions for such method embodiments may be stored on a non-volatile programmable memory 1014 and executed by a processor 1008.

Figure 8:
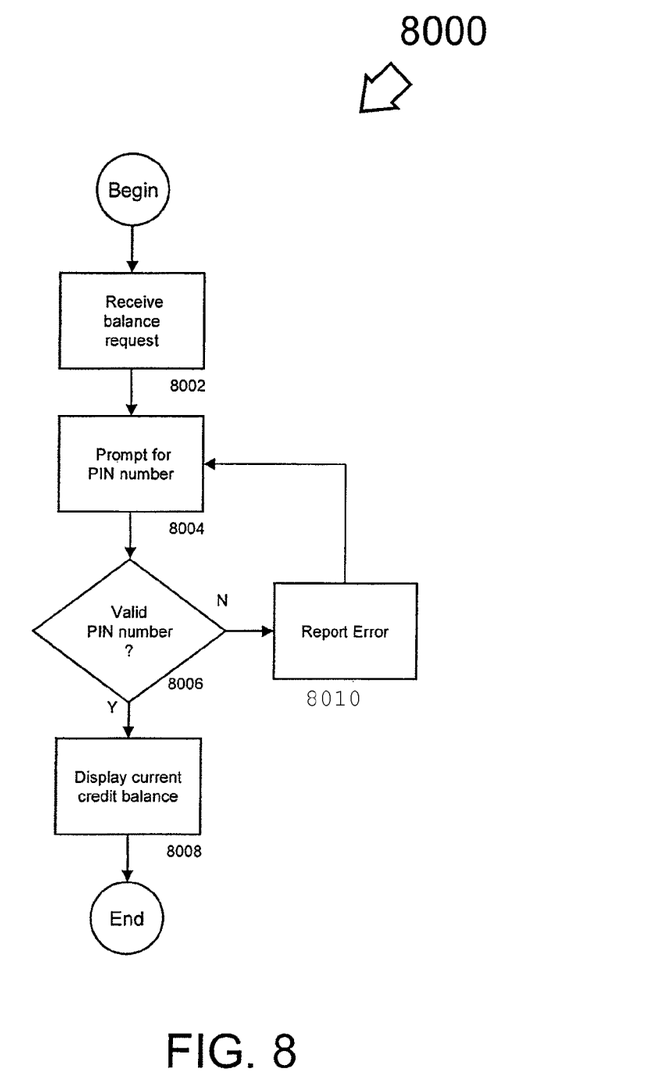
FIG. 8 illustrates a process embodiment to display the current balance or remaining credit limit information of a credit card.

FIG. 8 illustrates a process embodiment to display the real-time credit card balance, available credit, cash limit, or available cash balance of a credit card (1000 or 2000), constructed and operative in accordance with an embodiment of the present invention. When a user wants to know the balance of credit card (1000, 2000), the user requests the balance through pressing button 1006. The card receives the balance request, block 8002.

In card (2000) embodiments that utilize a personal identification number (PIN), display 1004 prompts the user for the PIN number, block 8004. The personal identification number may be stored in non-volatile programmable memory 1014 or in a magnetic stripe. At this point, the user may enter a PIN number using buttons 1006*a-c*.

In some embodiments, an error message is displayed when an invalid PIN number is entered, block 8010, and flow returns to block 8004.

Upon receipt of a valid PIN number as determined at decision block 8006, the display shows the remaining prepaid balance, block 8008.

In embodiments where a credit card 1000 does not use a PIN number, the remaining prepaid balance is displayed 8008 whenever the button 1006 is depressed.

Figure 5:
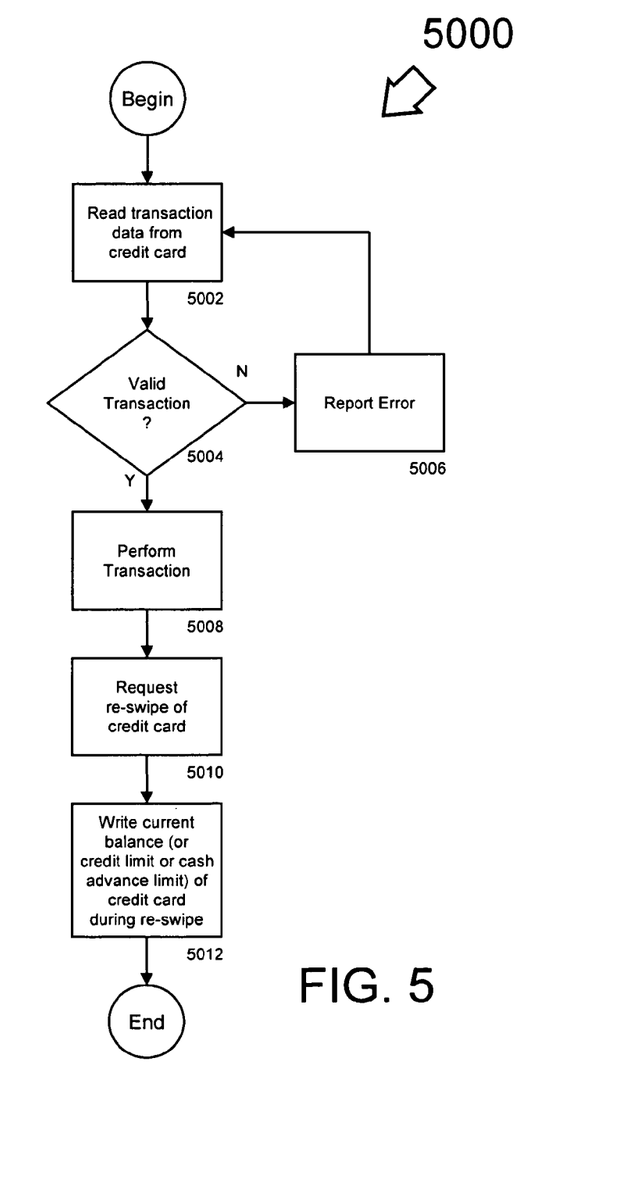
FIG. 5 is a flow chart of a card-writer process embodiment configured to store current balance or remaining credit limit information on a credit card after a payment transaction.

Turning to FIG. 5 is a flow chart of a card-writer process embodiment configured to store real-time credit card balance, available credit, cash limit, or available cash balance information on a credit card after a payment, cash withdrawal or other financial transaction, constructed and operative in accordance with an embodiment of the present invention.

When a credit card (1000 or 2000) is presented for payment at a merchant 3200, the primary account number and other data may be read at a card point-of-sale read/writer 3210, block 5002. The card (1000 or 2000) may be presented in a variety of different methods, such as swiping the card (1000 or 2000) or via a contactless ("pay wave") radio-frequency presentation, as are known in the art.

A credit card validation, as is known in the art, is performed using the data retrieved from the credit card (1000 or 2000). In some embodiments, merchant central computer 3230 consults with hot list storage 3240 to determine whether the transaction may be validated. In other embodiments, merchant central computer 3230 contacts acquirer 3300 to determine whether the transaction is valid. If the transaction is invalid as determined at decision block 5004, an error message is returned at block 5006. When the transaction is valid, flow continues at block 5008.

At block 5008, the payment transaction occurs.

At block 5010, the user is prompted to re-present the credit card (1000 or 2000). In card embodiments that use a magnetic strip, the presentation may be accomplished as a swipe of the card (1000 or 2000). During the card swipe, the remaining balance of the credit card (1000 or 2000) is written to the magnetic strip. The amount of the remaining balance may be received from issuer 3500 or payment processor 3400, or calculated by the merchant 3200 using information received from issuer 3500. In some embodiments, the card balance is written to track 3 of the magnetic strip. In other embodiments, the card balance may be written to a non-volatile programmable storage media 1014.

Figure 6:
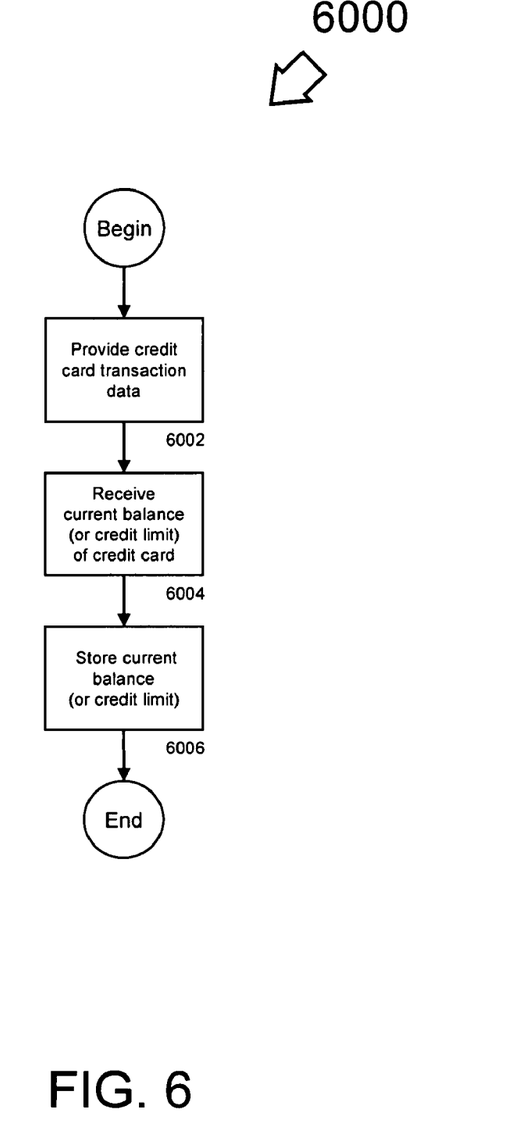
FIG. 6 illustrates a process embodiment that stores current balance or remaining credit limit information on a credit card after a payment transaction.

FIG. 6 illustrates a process embodiment that stores real-time credit card balance, available credit, cash limit, or available cash balance on a credit card after a payment transaction, constructed and operative in accordance with an embodiment of the present invention. As part of the payment transaction, primary account number and other information may be provided to merchant 3200, block 6002. Credit card (1000 or 2000) is received from a card point-of-sale read/writer 3210, via the conductive contact-making element 1018 or an embedded radio-frequency antenna embedded within the card (1000 or 2000), block 6002, and written to a magnetic strip or non-volatile programmable storage memory 1014. In magnetic strip embodiments, the card balance may write to track 3 or other tracks. In "smart card" embodiments, non-volatile programmable memory 1014 stores the card balance.

Figure 7:
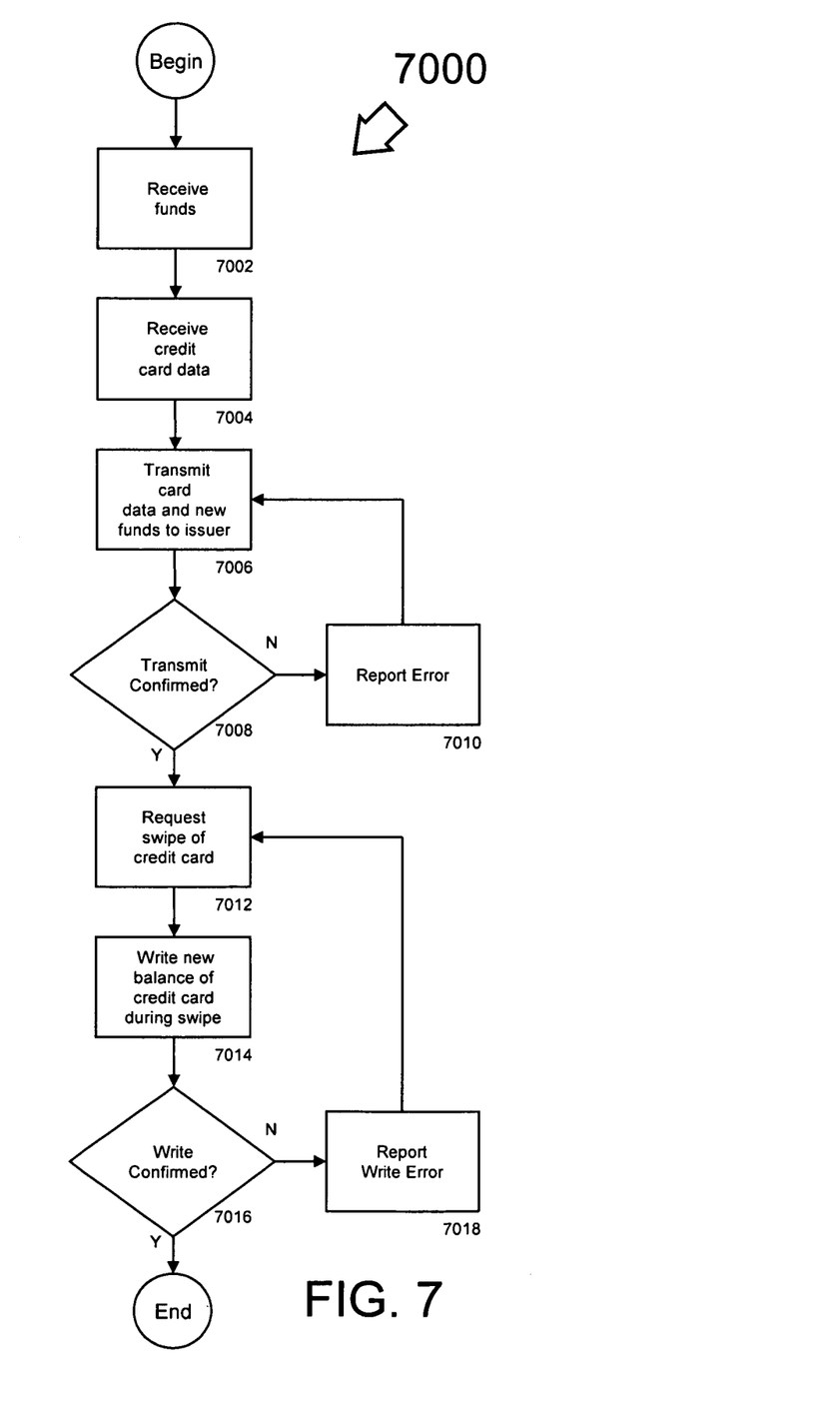
FIG. 7 is a flow chart of a card-writer process embodiment that stores current balance or remaining credit limit information on a credit card after a partial or entire balance payment.

At certain times, credit card 2000 users may want to add additional funds to their card 2000. In such instances, the balance of credit card 2000 needs to be updated to accurately reflect the total. FIG. 7 depicts a flow chart of a card-writer process 7000 embodiment that stores new balance information on a credit card 2000 after a payment, constructed and operative in accordance with an embodiment of the present invention. FIG. 7 assumes that the card reload is occurring at merchant 3200 in communication with issuer 3500; it is understood that the reload card may also occur at other locations.

At first, merchant 3200 receives funds from consumer 3100, block 7002. The amount of the funds may vary, and may be limited by the issuer 3500. The transfer of funds may occur through a variety of different methods, including cash, or various electronic payment methods. The credit card 2000 is presented to a card point-of-sale read/writer 3210, and the primary account data 7004 is received, block 7004. The card data and new funds are transmitted to the issuer at block 7006.

If the transmission to the issuer 3500 is not confirmed, as determined by decision block 7008, an error is reported at block 7010, and flow returns to block 7006.

When the transmission to the issuer 3500 is successful, process 7000 continues at block 7012.

At block 7012, card point-of-sale read/writer 3210 requests the re-presentation of the card 2000. During the presentation, the new balance of the prepaid card is written to the card 2000. The amount of the new balance may be received as data from payment processor 3400, issuer 3500 or calculated by the merchant 3200 using information received from issuer 3500 or payment processor 3400. In card embodiments that use a magnetic strip, the presentation may be accomplished as a swipe of the card 2000. During the card swipe, the remaining balance of the credit card 2000 is written to the magnetic strip. In some embodiments, the card balance is written to track 3 of the magnetic strip. In other embodiments, the card balance may be written to a non-volatile programmable storage media 1014.

If the card balance write is not confirmed, as determined by decision block 7016, an error is reported at block 7018, and flow returns to block 7012.

When the write is successful, process 7000 ends.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method performed by a credit card comprising:
    in a first process of displaying a current card balance, receiving a balance request from a button on the credit card, wherein the credit card is associated with only a single credit card account;
    processing the balance request using a processor of the credit card, wherein processing the balance request comprises prompting for input of a personal identification number (PIN);
    retrieving the current card balance encoded on a non-volatile programmable memory of the credit card that is configured to store the current card balance;
    displaying the current card balance on a display of credit card, wherein the display is coupled to a plastic support imprinted with credit card information;
    in a second process of displaying a current remaining credit limit, receiving a current remaining credit limit request from the button on the credit card, wherein the current remaining credit limit equals approximately the difference between a credit limit associated with the credit card account and the current card balance;
    processing the current remaining credit limit request using the processor of the credit card, wherein processing the current remaining credit limit request comprises prompting for input of a PIN;
    retrieving the current remaining credit limit encoded on the non-volatile programmable memory of the credit card that is configured to store the current remaining credit limit; and
    displaying the current remaining credit limit on the display of credit card.

2. The method of claim 1, further comprising: determining whether the personal identification number is valid.

3. The method of claim 2, wherein the current card balance is displayed only if the personal identification number is determined to be valid.

4. The method of claim 1, wherein the current card balance is encoded on a magnetic stripe on the credit card.

5. The method of claim 4, wherein the current card balance is encoded on track 3 of the magnetic stripe on the credit card.

6. The method of claim 1, wherein the current card balance is encoded on a non-volatile programmable memory in the credit card.

7. The method of claim 1, wherein the credit card performs credit card transactions only.

8. A credit card comprising:
    a credit card account associated with the credit card;
    a plastic support imprinted with credit card information;
    a processor coupled to the plastic support;
    a non-volatile programmable memory, coupled to the processor, configured to store a current card balance;
    a button configured to receive a request for the current card balance and configured to receive a request for a current remaining credit limit, wherein the current remaining credit limit equals approximately the difference between a credit limit associated with the credit card account and the current card balance; and
    a display configured to show, after receiving an input of a personal identification number (PIN) on the credit card responsive to the button receiving the requests, the current card balance when the button receives the request for the current card balance and the current remaining credit limit when the button receives the request for the current remaining credit limit.

9. The credit card of claim 8, further comprising:
    a processor configured to determine whether the personal identification number is valid.

10. The credit card of claim 9, wherein the current card balance is displayed only if the personal identification number is determined to be valid.

11. The credit card of claim 8, further comprising a conductive contact making element for interaction with a point of sale device.

12. The credit card of claim 8, further comprising a contactless element for interaction with a point of sale device.

13. The credit card of claim 8, further comprising a numeric or alphanumeric keypad coupled to the processor.

14. The credit card of claim 8, further comprising a plurality of buttons for entering alphanumeric information coupled to the processor.

15. The credit card of claim 14, wherein plurality of buttons for entering alphanumeric information comprise an up arrow button and a down arrow button.

16. The credit card of claim 8, further comprising a numeric or alphanumeric keypad coupled to the processor.

17. The credit card of claim 8 further comprising a button configured to receive a request for a current remaining cash advance limit.

18. The credit card of claim 17, wherein the button configured to receive a request for a current remaining cash advance limit and the button configured to receive a request for the current card balance are different buttons.

19. The credit card of claim 17, wherein the current remaining cash advance limit is determined by subtracting a current cash advance balance from a cash advance limit.

20. The credit card of claim 8, wherein the credit card stores only credit card data.

21. The credit card of claim 20, wherein the credit card does not perform debit card functions.

* * * * *